Nov. 24, 1942.  E. S. ENGLE  2,303,116
DISPENSING DEVICE
Filed Dec. 30, 1940  2 Sheets-Sheet 1
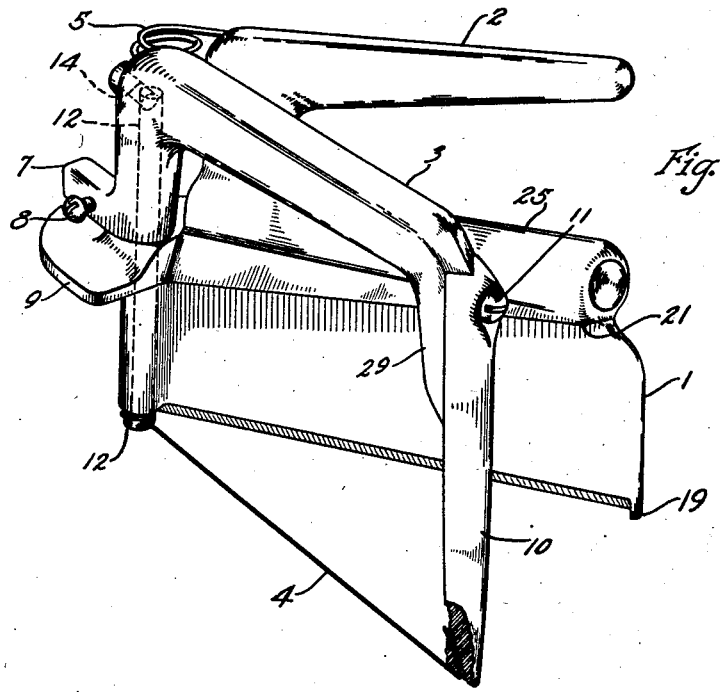
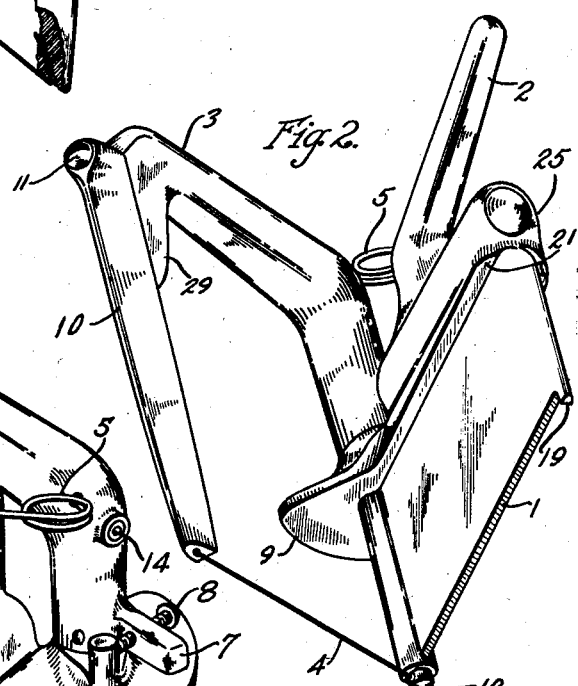
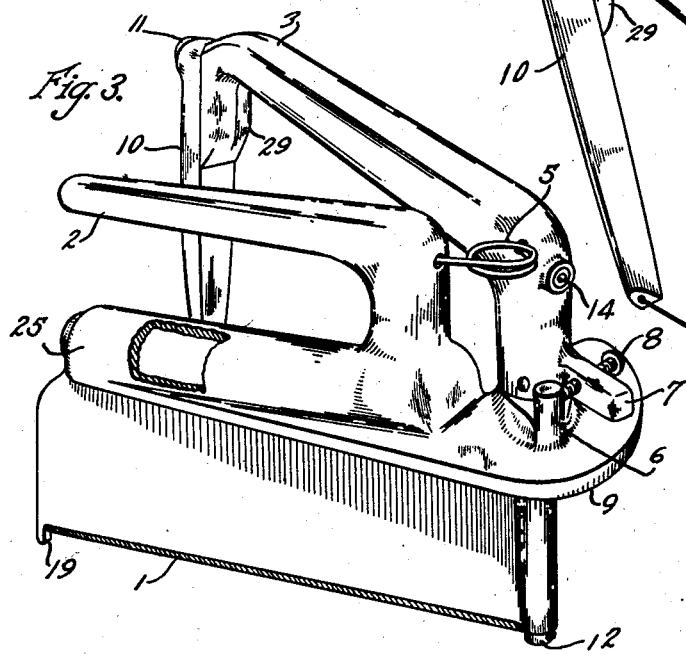
INVENTOR
Edgar S. Engle.
BY
S. A. Strickler
ATTORNEY Nov. 24, 1942.  E. S. ENGLE  2,303,116
DISPENSING DEVICE
Filed Dec. 30, 1940　　2 Sheets-Sheet 2
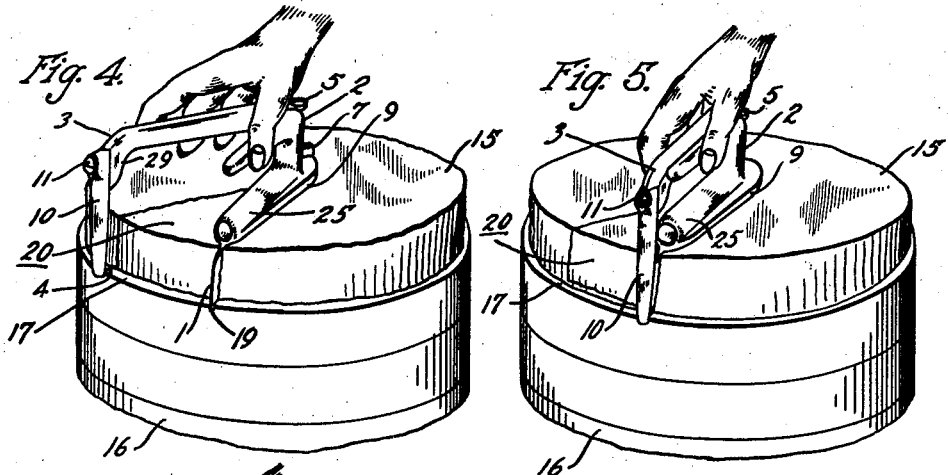
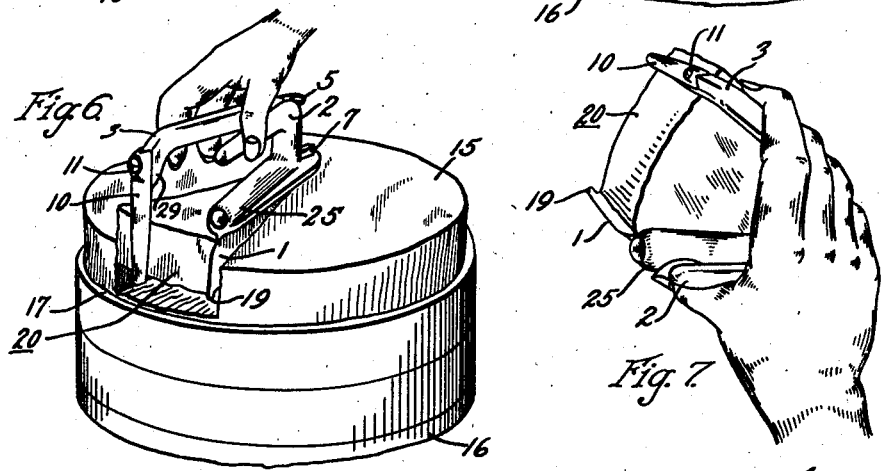
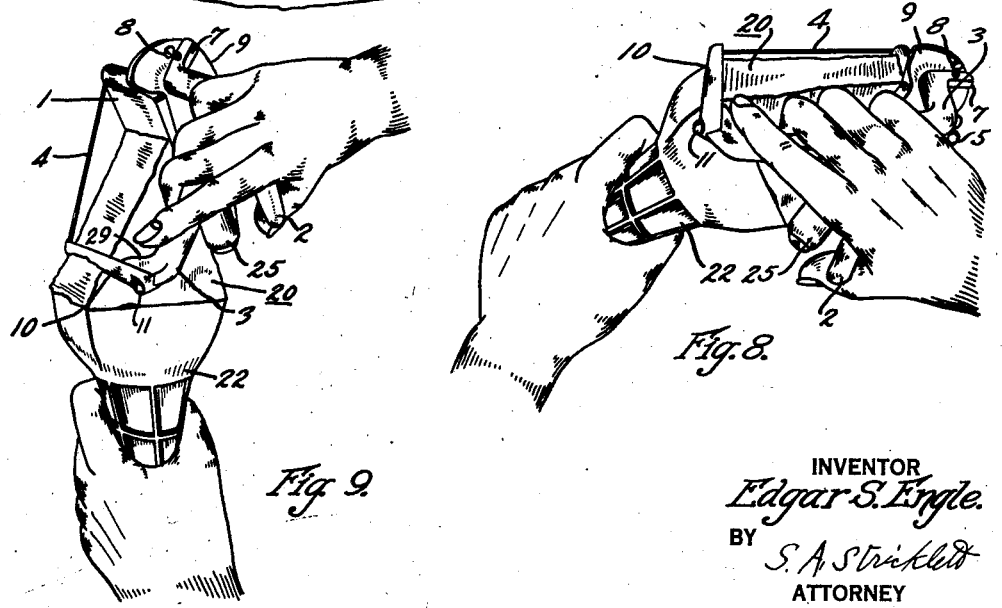
INVENTOR
Edgar S. Engle.
BY
S. A. Strickled
ATTORNEY Patented Nov. 24, 1942

2,303,116

UNITED STATES PATENT OFFICE 2,303,116

DISPENSING DEVICE

Edgar S. Engle, Greensburg, Pa.

Application December 30, 1940, Serial No. 372,363

15 Claims. (Cl. 30—124)

My invention relates to a dispensing device, and particularly, to a device for dispensing solidified confections, such as ice cream, sherbets, ices, custards, and the like.

In the dispensing of a solidified confection, it has heretofore been customary to utilize molds, scoops, or such like devices for gathering a quantity of the confection to make an individual sales piece. These gathered quantities may be served either in suitable holders, such as the well known ice cream cone, or in any other suitable container for utilization by the customer.

The gathering devices heretofore utilized have had a crushing effect on the confection and because of the cellular-like construction of the confection, the crushing breaks down the cellular structure and not only reduces the volume of the material being sold, but compresses it together to make an ice-like mass having an inferior flavor and undesirable edible qualities.

According to my invention, I have provided a handling device for cutting out and handling solidified confections, without breaking down the cellular structure or otherwise disturbing the mass of the confection being sold. Not only does this device preserve the desirable characteristics of the confection, but greatly increases the number of salable articles which may be cut from a given quantity of the confection. For instance, by the normal method of scooping, it is customary to get an average of 80 to 90 ice cream cones from a five gallon can of the confection. However, with my system, it is possible to secure 140 servings from the same quantity of material, each serving not only being larger in size than that secured by the former method, but also having the original delicate flavor and composition as when first put into the can.

It is an object of my invention to provide a device for handling a solidified confection.

It is a further object of my invention to provide an ice cream cutter which will provide a service portion of ice cream without materially disturbing the cellular structure of the mass.

It is a further object of my invention to provide a confection cutter which will cut off and handle an individual serving of confection with a minimum of effort.

Other objects and advantages of my invention will be apparent from the following detailed description taken in conjunction with the accompanying drawings, in which:

Figure 1 is a perspective view of a cutting implement according to my invention;

Fig. 2 is a perspective view of the cutter looking from the bottom front;

Fig. 3 is a similar view looking from the back of the cutter; and

Figs. 4–9 are perspective views showing the successive steps in utilizing my cutter to cut out and serve a portion of confection.

In the exemplary embodiment of my invention, the cutter comprises a cutting blade 1 having a handle 2 rigidly attached thereto and a swinging framework 3 hingedly connected at one end of the cutting blade 1. To this framework 3 is connected a cutting wire 4 which provides a cutting implement for doing the major portion of the cutting. In order to preserve the members of the cutter in operable position, I have provided a suitable spring member 5 connected between the cutting blade 1 and the swinging cutter 4 so that the spring 5 normally tends to maintain the elements 1 and 4 in an open position.

To control the opening angle, I have provided a stop member 6 on the fixed blade 1 and a cooperating stop 7 on the swinging member 3. For purposes of illustration, I have shown an adjustable screw 8 for regulating the angle of opening. However, in normal practice, the cutters 1 and 4 will have a fixed stop to cut a predetermined size of confection serving.

The blade 1 is provided with a suitable stop or gauge 9 for controlling the depth of penetration of the blade 1 into the solidified confection.

The swinging member 3 carrying the cutting wire 4 is preferably constructed in two parts, one of which is a handle frame having an extended portion 29 and a wire support 10 secured in fulcrum relation to the portion 29 so that the cutter wire 4 may be assembled and then tightened by screwing down a set screw 11 to rotate the wire support 10 over the fulcrum 29 and thus maintain the desired tension on the cutter wire 4.

While the cutter wire 4 may be secured to the supporting members in any desired manner, I prefer to provide a reversely inclined opening through the supporting member 10 and to thread a portion of the cutting wire 4 therethrough. Then when the supporting members tension the cutting wire 4, the acute angle maintains the wire 4 in permanent position.

While the various members of the swinging frame 3 may be made integral with each other, I prefer to construct the hinge as a separate pin 12 extending through both the stationary blade 1 and the end of the swinging arm 3 holding and positioning the latter by means of a suitable set screw 14. In this manner, it is possible to release the set screw 14 and completely disassemble the device for ease in cleaning or repairing the structure.

In the operation of the cutter according to my invention, the cutter in open position is applied to the exposed portion of a package 16 of a solidified confection 15 in such manner that the closed end is adjacent the center of the confection 15 and the fixed blade 1 extends beyond the edge of the confection 15 and preferably beyond the rim 17 of the confection container 18. In this position, the cutter is pressed down so that the fixed blade 1 and the swinging wire 4 each engage the top of the confection container 16 and the gauge member 9 is flush on the top of the confection 15 as shown in Fig. 4. Preferably, the blade 1 is provided with an extension 19 for engaging the edge of the container 18 for maintaining the blade 1 in fixed relation.

The swinging cutter 4 is then swung toward the fixed blade 1 to cut off a portion 20 of the confection 16, as shown in Fig. 5. The swinging member 3 then returns toward its initial position and is stopped in such position that the cutter wire 4 is underneath the severed portion 20 of the confection 15. The entire severed portion 20 is then lifted between the cutter wire 4 and the blade 1, as shown in Fig. 6.

The cutter device is then turned on the side as shown in Fig. 7, so that the cut-off portion 20 of confection rests on the blade 1 and against a stop 21 at the top edge of the blade 1. In this position, the confection may be applied to any suitable container, such as an ice cream cone 22, as shown in Fig. 8, and then by releasing the swinging member 3 it may be clamped on a portion of the confection for solidly pressing it into the container as shown in Fig. 9.

In operation, it is found that after several cuts have been made on frozen confection, the metal of the cutter becomes chilled so that the confection tends to freeze fast to the cutter. I have found that this condition may be greatly improved by providing a suitable container 25 on the top of the blade 1 and putting in this container 25 a suitable liquid having a high latent heat characteristic so that the liquid will maintain the blade 1 in a normal operating condition for a longer period of time.

While for purposes of illustration, I have shown and described a specific embodiment of my invention, it will be apparent that changes and modifications can be made therein without departing from the true spirit of my invention and the scope of the appended claims.

I claim as my invention:

1. A confection handling device comprising a blade, a depth gauge on said blade, a frame member, a hinge pin connecting said blade and said frame, a cutter carried by said frame, and resilient means for normally positioning said blade and said frame in V relation.

2. A confection handling device comprising a blade, a depth gauge on said blade, a frame member, a hinge pin connecting said blade and said frame, a cutter carried by said frame, and resilient means for normally positioning said blade and said frame in V relation, and a guide member on said blade.

3. A confection handling device comprising a cutter blade, a depth gauge on said blade, a frame hingedly connected adjacent one end of said blade, a wire-like cutter element carried by said frame, means on said frame for tensioning said wire-like cutter element.

4. A confection handling device comprising a cutter blade, a depth gauge on said blade, a frame hingedly connected adjacent one end of said blade, a wire-like cutter element carried by said frame, a fulcrum member on said frame, a supporting member on said fulcrum for said wire-like element, and means for rotating said supporting member over said fulcrum for tensioning said wire-like cutter element.

5. A confection cutter comprising a pair of cutting elements arranged in V formation, a hinge element at the apex of the V for hingedly connecting said cutting elements and handles on said cutting elements, one of said cutting elements being a wire-like member supported on a frame.

6. A cutter for solidified confection comprising a blade, a handle on said blade, a frame hingedly connected adjacent one end of the blade and a wire-like cutting element carried on said frame.

7. A cutter for solidified confection comprising a blade, a handle on said blade, a frame hingedly connected adjacent one end of the blade and a wire-like cutting element carried on said frame, and means on said frame for stretching said wire-like cutting element.

8. A confection cutting device comprising a cutting element, a frame structure hingedly connected to said cutting element, a wire-like cutting element carried by said frame, a gauge element on said first-mentioned cutting element to determine the depth of cut and handles for controlling said cutting elements.

9. A confection handling device comprising a blade, a gauge on said blade, a handle on said blade, a frame structure hingedly connected to said blade adjacent one end thereof, a cutting element carried by said frame and resilient means for normally maintaining said blade and said frame in V relation.

10. A confection handling device comprising a blade, a gauge on said blade, a handle on said blade, a frame structure hingedly connected to said blade adjacent one end thereof, a cutting element carried by said frame and resilient means for normally maintaining said blade and said frame in V relation, and latent heat storing means connected to said blade.

11. A confection cutter for cutting a wedge-shaped piece comprising a pair of cutting elements arranged in V formation, one of said cutting elements being a wire-like element.

12. A device for cutting out a wedge-shaped piece of solidified confection comprising a pair of hingedly connected cutting elements arranged in a V formation, and a gauge on one of said elements to determine the depth of cut.

13. A confection handling device comprising a blade, a depth gauge on said blade, a handle on said blade, a swinging frame connected in V relation to said blade, a wire-like cutter carried by said frame, resilient means for normally holding said blade and said cutter in open position, and means for determining the extent of said opening.

14. A confection handling device comprising a blade, a depth gauge on said blade, a handle on said blade, a swinging frame connected in V relation to said blade, a wire-like cutter carried by said frame, resilient means for normally holding said blade and said cutter in open position, and means for determining the extent of said opening, and a stop on said blade for controlling a portion of confection cut off by said cutter.

15. A confection handling device comprising a blade, a depth gauge on said blade, a handle on said blade, a swinging frame connected in V relation to said blade, a wire-like cutter carried by said frame, resilient means for normally holding said blade and said cutter in open position, and means for determining the extent of said opening, and heat storing means associated with said blade.

EDGAR S. ENGLE.